Oct. 27, 1925.

G. CAYER 1,558,462

VEHICLE AXLE

Filed Dec. 27, 1923     2 Sheets-Sheet 1

INVENTOR.
G. Cayer.

By Ralph Burch
his Attorney.

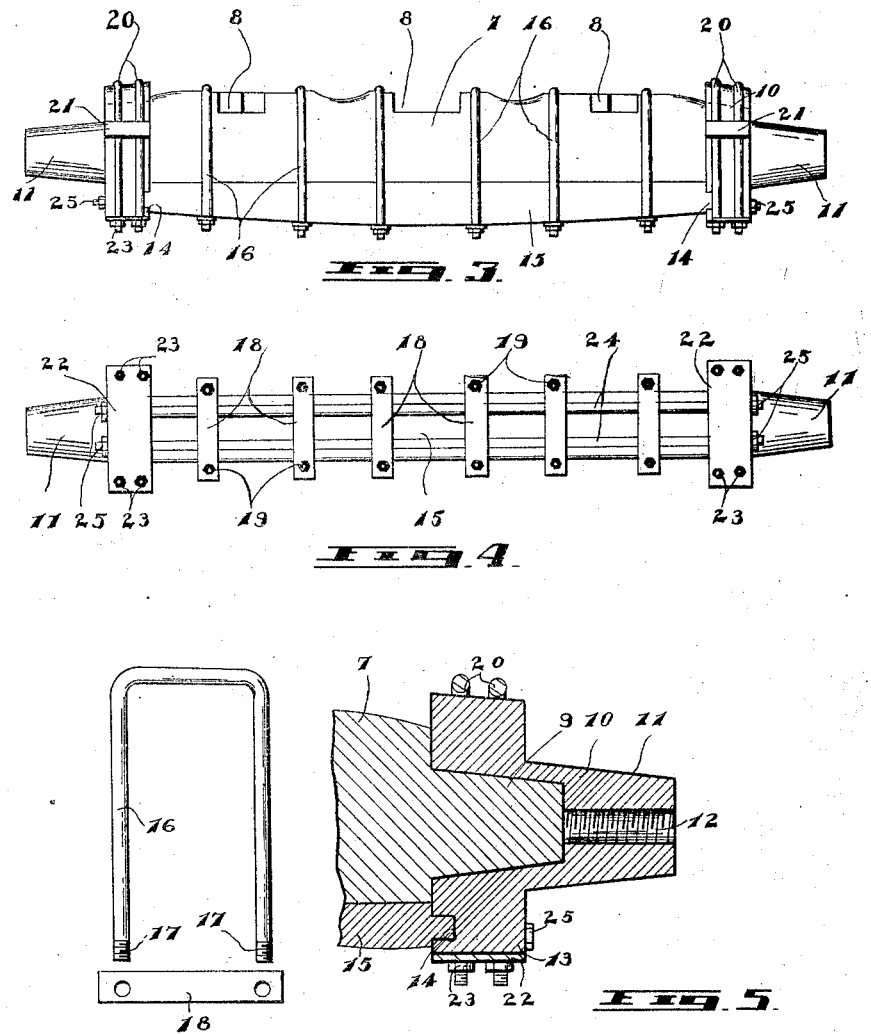

Patented Oct. 27, 1925.

1,558,462

UNITED STATES PATENT OFFICE.

GEDEON CAYER, OF WILLOW BUNCH, SASKATCHEWAN, CANADA.

VEHICLE AXLE.

Application filed December 27, 1923. Serial No. 683,010.

*To all whom it may concern:*

Be it known that I, GEDEON CAYER, a citizen of the Dominion of Canada, residing at Willow Bunch, in the county of Moose Jaw, in the Province of Saskatchewan, have invented certain new and useful Improvements in Vehicle Axles, of which the following is a specification.

This invention relates to vehicle axles and consists of certain improvements in construction therefor and more particularly the invention relates to means for reinforcing an axle tree by means of tie rods and strengthening yokes.

A further object is the provision of spindles or hub carrying means that are separably connected to the axle tree to allow of their removal or repair.

A further object is the provision of such a device which will be substantially rugged in construction, serviceable in use and will not yield to lateral, longitudinal or torsional strain.

To the accomplishment of these and related objects my invention resides in the construction, combination and arrangement of the various cooperating elements, as shall be hereinafter more fully described, illustrated in the accompanying drawings and pointed out in the claims hereunto appended.

In the drawings forming a part of this specification wherein like characters of reference designate like parts throughout the several views;

Figure 3 is an elevation thereof;

Figure 4 is a bottom plan of Fig. 3;

Figure 5 is a fragmental section of the thimble skein applied to an end of the axle proper; and Figure 6 is a detail of the reinforcing yoke and cooperating plate adapted to bind the axle and truss bar.

Figure 1:
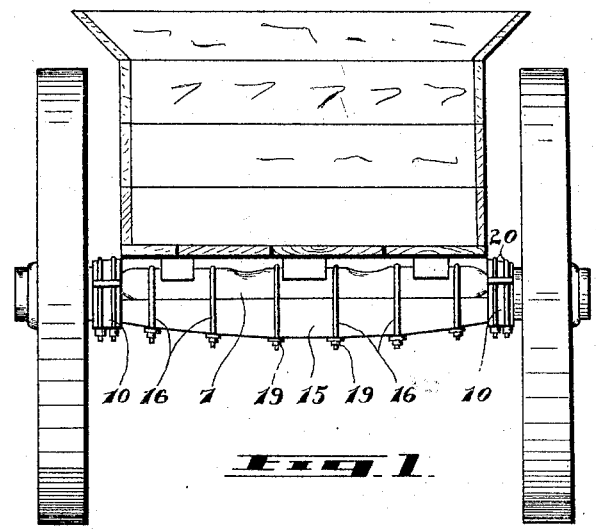
Figure 1 is a rear elevation of a wagon embodying the preferred form of my invention.
Figure 2:
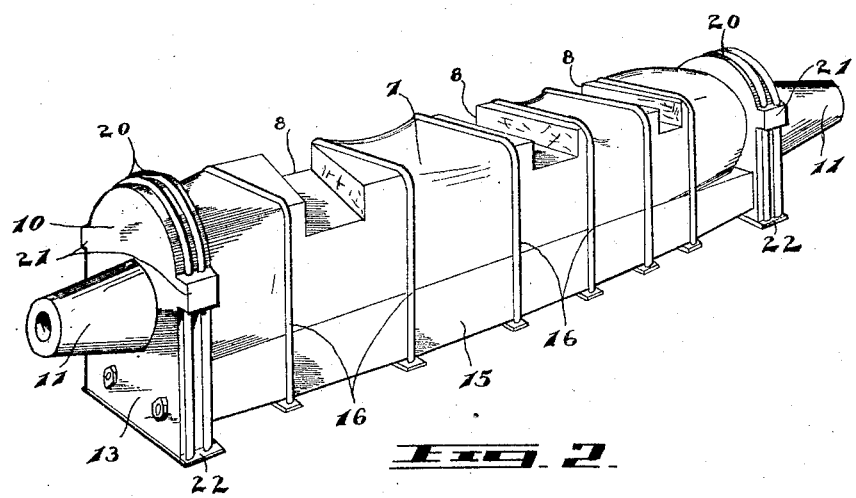
Figure 2 is a perspective elevation of this axle.

In my invention I employ an axle 7 provided with recessed seats 8 adapted to receive the pole and under carriage of a wagon in the usual manner, the ends of the axle being tapered as illustrated at 9, in Figure 5, to receive the thimble skein 10.

This skein terminates in a conventional axle receiving spindle 11 having a centrally threaded axially disposed recess 12 to receive a hub retaining bolt, and extends substantially below the lower edge of the axle 7, as in the skirt 13, such depending portion being provided with interiorly arranged recessed seat 14 to receive the dovetail end of the truss bar 15.

A plurality of spaced yokes 16, having threaded end portions 17, with cooperating perforated cross plates 18 are adapted to securely bind the axle 7 and truss bar 15, said threaded portions 17 of the yokes being provided with suitable nuts 19. A pair of vertically disposed similar yokes 20 straddle each of the skeins 10, and passing through perforations provided in diametrically disposed wing extensions 21 on the skein, and in the bottom plates 22, are held in position by the nuts 23 received by their threaded ends.

Longitudinally disposed tie rods 24, as illustrated in Figure 4, are received in parallel grooves in the underside of the truss bar 15, and passing through perforations provided in the depending butts 13 of the skeins 10, to receive suitable nuts 25 on their threaded ends.

In the foregoing description taken in connection with the accompanying drawings it will be manifest that a vehicle axle is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said acompanying specification and drawings shall be interpreted as illustrative and not in a limited means.

What I claim as new is:—

1. A vehicle axle skein; having a depending recessed skirt portion; an axle truss having a reduced end portion engaged in the recess of said skein; and supporting means extended beneath said truss and through the lower portion of said skein.

2. An axle truss having extended reduced end portions; a pair of thimble skeins having depending skirt portions provided with recesses to receive the reduced end portions of said truss; said thimble skeins being adapted to receive the spindle extensions of the axle resting on said truss; a plate beneath each of said thimble skeins; suspending means for said plates extending around said thimble skeins; and brace rods extended longitudinally beneath said truss and secured in the lower portions of said thimble skeins.

3. An axle truss having its lower face grooved longitudinally and provided with longitudinal channels; thimble skeins having depending skirt portions with transverse recesses; said truss having reduced end portions resting in said recesses of the thimble skeins; said thimble skeins being adapted to be secured on the spindle extensions of the axle resting on said truss; brace rods extended along the longitudinal channels of said truss; plates arranged transversely beneath said truss and said rods; and clamping members extended over said truss and the axle resting thereon and secured in said plates.

In testimony whereof I affix my signature.

GEDEON CAYER.